United States Patent
Berstis et al.

(10) Patent No.: US 6,901,367 B1
(45) Date of Patent: May 31, 2005

(54) FRONT END TRANSLATION MECHANISM FOR RECEIVED COMMUNICATION

(75) Inventors: Viktors Berstis, Austin, TX (US); Linda Arnold Lisle, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 970 days.

(21) Appl. No.: 09/238,800

(22) Filed: Jan. 28, 1999

(51) Int. Cl.⁷ .......................... G01L 15/18; G01L 21/00
(52) U.S. Cl. .............................. 704/277; 704/270
(58) Field of Search .................. 704/270, 275, 704/277, 2, 7, 200, 270.1

(56) References Cited

U.S. PATENT DOCUMENTS

| | | | | |
|---|---|---|---|---|
| 5,546,500 A | * | 8/1996 | Lyberg | 704/277 |
| 5,884,246 A | * | 3/1999 | Boucher et al. | 704/2 |
| 5,884,247 A | * | 3/1999 | Christy | 704/7 |

* cited by examiner

Primary Examiner—Richemond Dorvil
(74) Attorney, Agent, or Firm—Richard A. Henkler; Leslie A. Van Leeuwen; Dillon & Yudell LLP (57) ABSTRACT

A method for allowing recipient translation of information received by a data processing system configured with a user interface having in a human language which is different from the human language of the transmitted information. A desired human language for user interface with resident software applications on said data processing system is first selected. Then incoming communications to the data processing system which involves transmission of human language-based ad information are intercepted and analyzed to determine if it is in a different human language than the desired human language. When the human language of the incoming communication differs from the desired human language, the human language of the incoming communication is dynamically translated into the desired human language. Finally, the translated incoming communication is transmitted in the desired human language to an output device of the data processing system.

28 Claims, 4 Drawing Sheets

FRONT END TRANSLATION MECHANISM FOR RECEIVED COMMUNICATION

BACKGROUND OF THE INVENTION

1. Technical Field

The present invention relates in general to an improved data processing system, and in particular to a method and system for enhanced communication on a data processing system. Still more particularly, the present invention relates to a method and system for enhanced communication by providing language translation of received messages on a data processing system.

2. Description of the Related Art

Language translation applications (software) are well known in the art. With the fast evolving global electronic network following the opening up of world-wide communication channels such as the Internet or World Wide Web, transmission of data and non-data communication in languages other than that of the receiving entity/system is becoming more and more common. The World Wide Web has introduced near instantaneous world wide communications; however, although the Web has helped to bring us all closer together, it has not removed the language barriers which exist in intercultural communications.

Email communication makes up a significant and fast growing portion of the communications environment which exist on the Internet. More and more users globally are communicating via email which is considerably cheaper than regular telephone network or other related communications systems.

Because of the global nature of the internet e-mail network, messages are often transmitted and received in languages other than the language of the recipient of the message. A message from Japan or Holland sent to a U.S.A. recipient would be received in Japanese or Dutch, respectively. With English as the preferred language of communication in the U.S.A., it is very probable that the recipient would be unable to comprehend the email without first translating it into English. Similarly, if the data processing system referencing the data or communication is configured in English, then it would not be able to reference the information without first translating it into English.

Currently, the only way to translate a message of this type is to transfer the text from the location it is received from to a language translation environment.

This often involves a cut and paste procedure wherein the user first cuts the foreign text from the receiving location, opens up a language translation software on the data processing system or alternatively going to a language translation environment on the web and then pastes the text into the a viewport within the language translation environment. The recipient then requests that the text be translated into a desired language.

AltaVista (TM) Translation utilizing Systran technology is one of the more common web locations which provide a language translation service. AltaVista's Translation Assistant provides a free service to the Internet community. Systran, a leader in the field of machine translations, provides a machine translation of the message received from one language to another selected language.

In machine translations, a data processing system is configured for translation utilizing language translation software. AltaVista Translation Assistant thus provides a user with a tool to translate a grammatically correct document into something comprehensible, although not perfect.

Systran Software, Inc. is the leading developer of natural language machine translation, having developed 28 language pairs. The Systran interface screen prompts a user to provide plain text in an input location. The user may then select the language pair he/she desires to be translated to/from (eg. French to English). The user then clicks on the "translate" button to complete the process. The text entered is translated into its English form and displayed to the user below the original French form. Other implementations of the Systran software permits for an entire URL content to be translated. Additionally, a language translation menu item may be added to the user's internet browser which access the Systran location directly.

Considerable research has been carried out on computer systems for the automatic translation of text. To date all translations have to be invoked by the user as described above. This is time consuming and also redundant, particularly when the user is already aware that he/she desires to read all communications in a particular language or alternatively where the data processing system has been configured for interfacing in a particular language.

It would therefore be desirable to have a method and system for automatically translating all incoming communication which is in a different language (foreign language) into the language desired by the user and/or configured on the data processing system. It would be further desirable to have translation immediately upon receipt without user manipulation or request for each individual communication.

SUMMARY OF THE INVENTION

It is therefore one object of the present invention to provide an improved data processing system.

It is another object of the present invention to provide a method and system for enhanced communication on a data processing system.

It is yet another object of the present invention to provide a method and system for enhanced communication by providing language translation of received messages on a data processing system.

The foregoing objects are achieved as is now described. A method is disclosed for allowing recipient translation of information received by a data processing system configured with a user interface having a human language which is different from the human language of the transmitted information. The method comprises of first selecting a desired human language for user interface with resident software applications on the data processing system. Then the method intercepts incoming communication to the data processing system which involves transmission of human language-based information and then analyzes the incoming communication to determine if it is in a different human language than the desired human language. When the human language of the incoming communication differs from the desired human language, the method dynamically translates the human language of the incoming communication into the desired human language. Finally, the method transmits the translated incoming communication in the desired human language to an output device of the data processing system.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
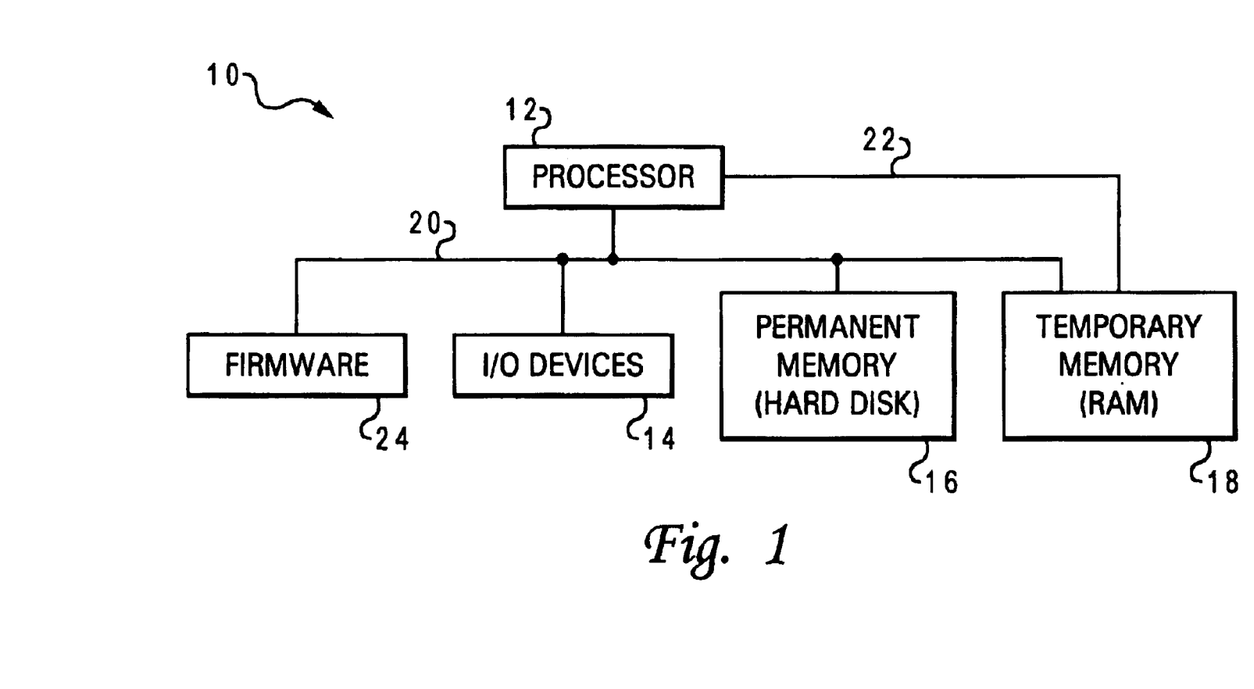
FIG. 1 is a diagram of a data processing system utilized in the preferred embodiment of the present invention.

With reference now to the figures, and in particular with reference to FIG. 1, there is depicted the basic structure of a data processing system 10 utilized in the preferred embodiment of the invention. Data processing system 10 has at least one central processing unit (CPU) or processor 12 which is connected to several peripheral devices, including input/output devices 14 (such as a display monitor, keyboard, and graphical pointing device) for user interface, a permanent memory device 16 (such as a hard disk) for storing the data processing system's operating system and user programs/applications, and a temporary memory device 18 (such as random access memory or RAM) that is utilized by processor 12 to implement program instructions. Processor 12 communicates with the peripheral devices by various means, including a bus 20 or a direct channel 22 (more than one bus may be provided utilizing a bus bridge).

Data processing system 10 may have many additional components which are not shown such as serial, parallel, and USB ports for connection to, e.g., modems or printers. In the preferred embodiment of the invention, communication to the data processing system is made possible via a modem connected to a land line (telephone system) which is in turn connected to a network provider such as an internet service provider (ISP). Additionally, data processing system may be connected to a network via an ethernet/network card. Communicated data arrives at the modem or network card and is processed to be received by the data processing system's CPU or other software application.

Those skilled in the art will further appreciate that there are other components that might be utilized in conjunction with those shown in the block diagram of FIG. 1; for example, a display adapter connected to processor 12 might be utilized to control a video display monitor, and a memory controller may be utilized as an interface between temporary memory device 18 and processor 12. Data processing system 10 also includes firmware 24 whose primary purpose is to seek out and load an operating system from one of the peripherals (usually permanent memory device 16) whenever the data processing system is first turned on. In the preferred embodiment, data processing system contains a relatively fast CPU 12 along with sufficient temporary memory device 18 and space on permanent memory device 16, and other required hardware components necessary for providing almost instantaneous translations of an incoming communication.

Conventional data processing systems often employ a graphical user interface (GUI) to present information to the user. The GUI is created by software that is loaded on the data processing system, specifically, the data processing system's operating system acting in conjunction with application programs. Two well-known GUIs include OS/2 (a trademark of International Business Machines Corp.) and Windows (a trademark of Microsoft Corp.).

This invention implements a front end translation mechanism that first intercepts incoming communication, such as email, transmitted in a different language, then translates it into a desired language providing the recipient with a message in the desired language. For the purposes of this invention incoming communications include email messages, files transmitted via file transfer protocol (FTP), internet/web pages, chat or newsgroup communications, and terminal emulation. Those skilled in the art recognize that this list may include other forms of incoming communication similar to those listed above.

The implementation of the present invention occurs on a typical data processing system as described above. In the preferred embodiment, data processing system is enhanced to provide instantaneous translations upon receipt of a communication in a different language. The operating system (OS) of the data processing system such as Microsoft's Windows '98 provides the data processing system with its software configurations. These software configurations includes the desired language set for interfacing on the data processing system. Most systems are pre-configured (hardware) in the language of its expected end market. In the preferred embodiment, OS contains an option within its language configuration which permits a user to request automatic translations of all incoming communication in a foreign language. In the preferred embodiment, the user selects the option for automatic translations to implement the invention.

In one embodiment of the invention, data processing system is loaded with a language translation package which provides internal translation software to the user. This software may be purchased separately from the data processing system and OS from a language translation company such as SYSTRAN of La Jolla, Calif., USA.

Where communication is received via an internet site with the user having a connection ID, the translation may be completed within the internet environment by sending the communication to a web site such as AltaVista's to complete the translation and return the translated message. An example of this application is detailed below.

Alternatively, the option for automatic translation may exist within a language translation software package. The language translation package may include software algorithm to request if the user wishes automatic translations and then reconfigure the data processing system to permit automatic translation.

In the preferred embodiment of the invention, the receiving data processing system is equipped with an email engine, such as Eudora. The engine is resident software for displaying and manipulating email messages. It contains a queue which sorts the mail, looks at it, and provides options to reply, etc. to an outgoing server utilizing Simple Mail Transfer Protocol (SMTP). Those skilled in the art are familiar with the workings of an email engine. An email message is routed to a Post Office Protocol (POP) server on which the mail is stored until accessed. When the user logs unto his mail account utilizing the email engine, and connects to the POP server, the incoming email messages are downloaded unto the user's data processing system into the email engine's In-box. In the preferred embodiment, the user specifies the POP server and the language to have the email arrive in and the translation occurs at the user/client side.

In one embodiment of the invention, web-based communication and email are provided with a language tag which identifies the language in which the communication was created to a recipient data processing system. Transport Control Protocol/Internet Protocol (TCP/IP) is the protocol utilized to link users together on the Internet, intranet and other networks. It allows businesses to communicate with each other, share e-mail across the globe, send files from one city to another, and exchange ideas through special forums such as newsgroups. It also permits data exchange and advertising over the web as well as terminal emulation. TCP/IP email also utilizes a POP server and e-mail engine to receive mail.

The present invention utilizes several of the features/specifications of TCP/IP communication to identify the language of the incoming communication. Through TCP/IP technology, the internal system of the sending data processing system is able to recognize that the receiving system probably speaks another language. Additional sources of language information includes IP header, the source and destination IP addresses, IP addressing (username), masking, domain name system, time stamping, address resolution protocol and File Transfer Protocol (FTP).

In one embodiment of the invention, a database is maintained of all IP addresses and the IP address of the received message is looked up in the database to determine which country it originated from and the corresponding native language in which the mail was written. This embodiment, however, like others described herein, utilizes further identification procedures to verify the originating language. Those skilled in the art will appreciate that the TCP/IP provides a plurality of identification measures by which the language type of the originating message may be determined and further that a plurality of identification steps may be required to accurately determine an originating language.

Communications transmitted as Hypertext Markup Language (HTML) documents and extended Markup Language (XML) documents, for example, contains an elaborate tag system that permits the receiving system to determine which messages may require translation as soon as the message arrives. These tags are language codes attached to the message header which may be utilized to identify the message as written in a different language.

Figure 2:
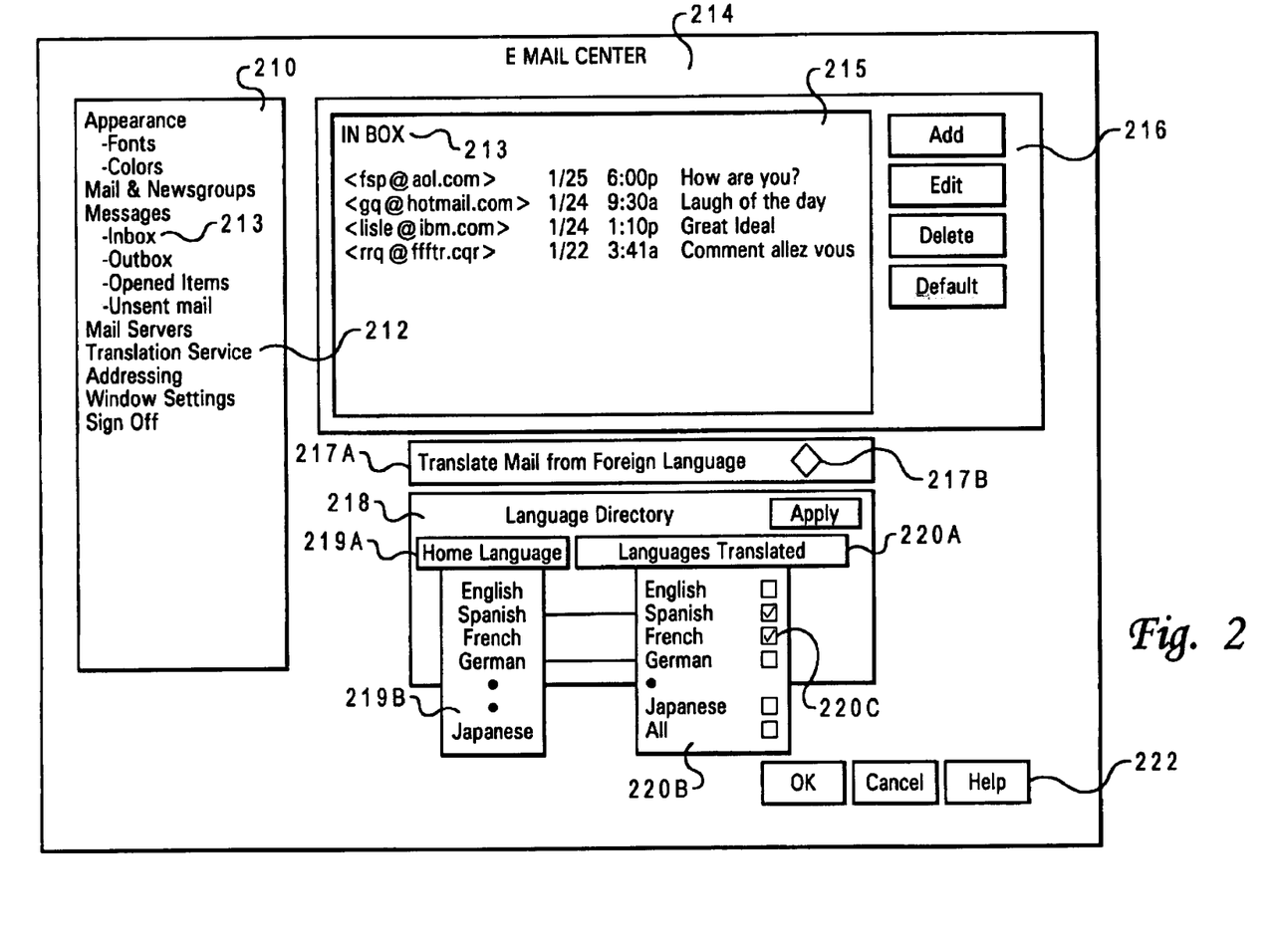
FIG. 2 is a diagram depicting an email engine GUI utilized in the preferred embodiment of the present invention.

In one illustrative embodiment in which e-mail communication is received by the user on an email engine, a series of steps necessary to implement the invention are disclosed. Email engine is created by software resident on the data processing system. Email engine typically consists of GUIs which provide a display area and a number of options for user interface. FIG. 2 depicts an email engine GUI 214 according to the preferred embodiment and shows how the invention may be implemented. Specifically, it depicts how the interface is augmented to include an automatic translation option. Email center is an email GUI 214 with various items for user interface including, a list of user options 210 which controls what is displayed in the display area 215 and how the email engine is configured. Included in these user options 210, is a translation service option 212. Translation service option 212 permits the user to select or change the configuration of the email engine to permit automatic translations of email received in foreign languages. Email center is equipped with an In-box 213 represented here as a user option 210 for the receipt of all incoming communications. In-box 213 acts as a mailbox and stores all incoming messages downloaded from the POP server until opened by the user. A typical web page consists of additional items such as Editing options 216, and Response options 222 for user interface.

FIG. 2 also depicts two interface areas below the display area 215 which are connected to translation service option 212. In the preferred embodiment, these areas open when translation service option 212 is selected by the user. The first area allows the user to select whether or not he desires to translate mail from foreign languages 217A. User may select this option by placing a tick in the response box 217B. The second area is the language directory 218 which allows a user to select a home language 219A of the email engine from a language list 219B and the languages desired to be translated 220A from a second language list 220B. Second language list 220B contains a list of languages along with response boxes 220C for the user to select. In this illustrative embodiment, user selection is indicated by a tick in response box 220C. In the preferred embodiment, any number of languages may be selected from second language list 220B. Also, in the preferred embodiment, the selected home language 219A does not appear as an option in second language list 220B.

In another embodiment of the present invention, a user selects a list of email addresses from which e-mail in foreign languages are received. In this embodiment, the user is provided with an option on the email engine to automatically translate email from these particular addresses into the desired language of the user. It is understood by those skilled in the art that variations exist in the embodiments of the present invention but that all these variations fall within the scope of the present invention.

In the preferred embodiment, once the user configures the data processing system or email engine, all incoming messages in a foreign language are translated at the time the message is downloaded unto the data processing system and prior to the user receiving the message. In one embodiment, this process involves sending the message from the inbox to a language translation center such as AltaVista's web site, dynamically requesting the translation, and storing the translated message along with the original message in the inbox. Another embodiment utilizes resident translation software packages which are loaded unto the data processing system and accessed to process the translations.

The illustration below depicts a message received in one language and automatically translated. The user receives the output below when he opens the message.

Remote host: [146.83.107.230]
Mailed to: hei@us.ibm.com
name: Humberto Urrutia Lopez
email: hurrutia@huemul.decom.uta.cl
subject: excellente material
comment: excellente material pero como hacer para obtener una version shareware para realizar una interfaz hombre maquina
HTTP-Referer:
http://www.ibm.com/ibm/hci/feedback/feedback.html
Browser: Mozilla/4.03 [en] (Win95; I)
This mail delivered courtesy of webmaster@www.ibm.com
This mail has been translated for you:
Subject excellent material
Comment: I am looking for a version of shareware that does machine interfaces In the preferred embodiment of the invention, the translation is completed and displayed sentence by sentence. The translated text is displayed in a different color and/or other attribute so that it is clearly presented and the recipient may follow/decipher the machine translation.

Figure 3:
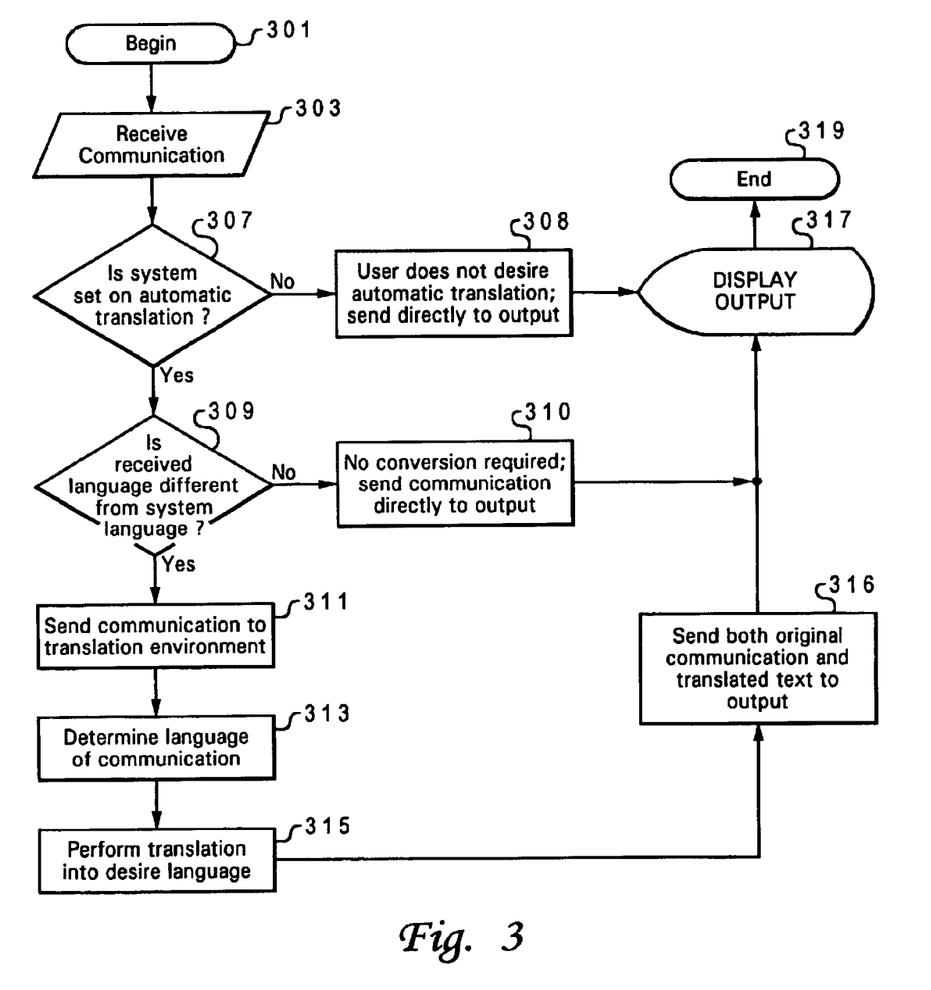
FIG. 3 is a logic flow chart of an implementation of the present invention on a data processing system in accordance with one embodiment of the present invention.

FIG. 3 depicts the process which occurs in a data processing system during the implementation of the invention. The process begins (step 301) when a communication is received (step 303) by the data processing system. A first determination is made as to whether or not the system is set for direct translation of incoming communication (step 307). If the system is not set for direct translation, then the user does not desire automatic translation and the incoming communication is outputed to the user (step 308). If, however, the system is set for direct transmission, then the process makes another determination to see whether or not the language received in the communication is the same as that of the data processing system (step 309). If the languages are the same, then no conversion is required and the communication is sent directly to output (step 310) and displayed to the user (step 317) without any translation. If, however, the received language is different from that of the data processing system, then the communication is sent to the language translation center (step 311). In the preferred embodiment, the language translation center is resident on the data processing system and consists of software algorithm which implements translations from one language to another. Translation center first determines the language of the incoming communication (step 313). Once the determination is completed, the text of the communication is translated to the language of the data processing system (step 315). Then, the translated text and the original communicated text is sent to the output (step 316) where it is displayed to the user (step 317). The process then terminates (step 319).

Figure 4:
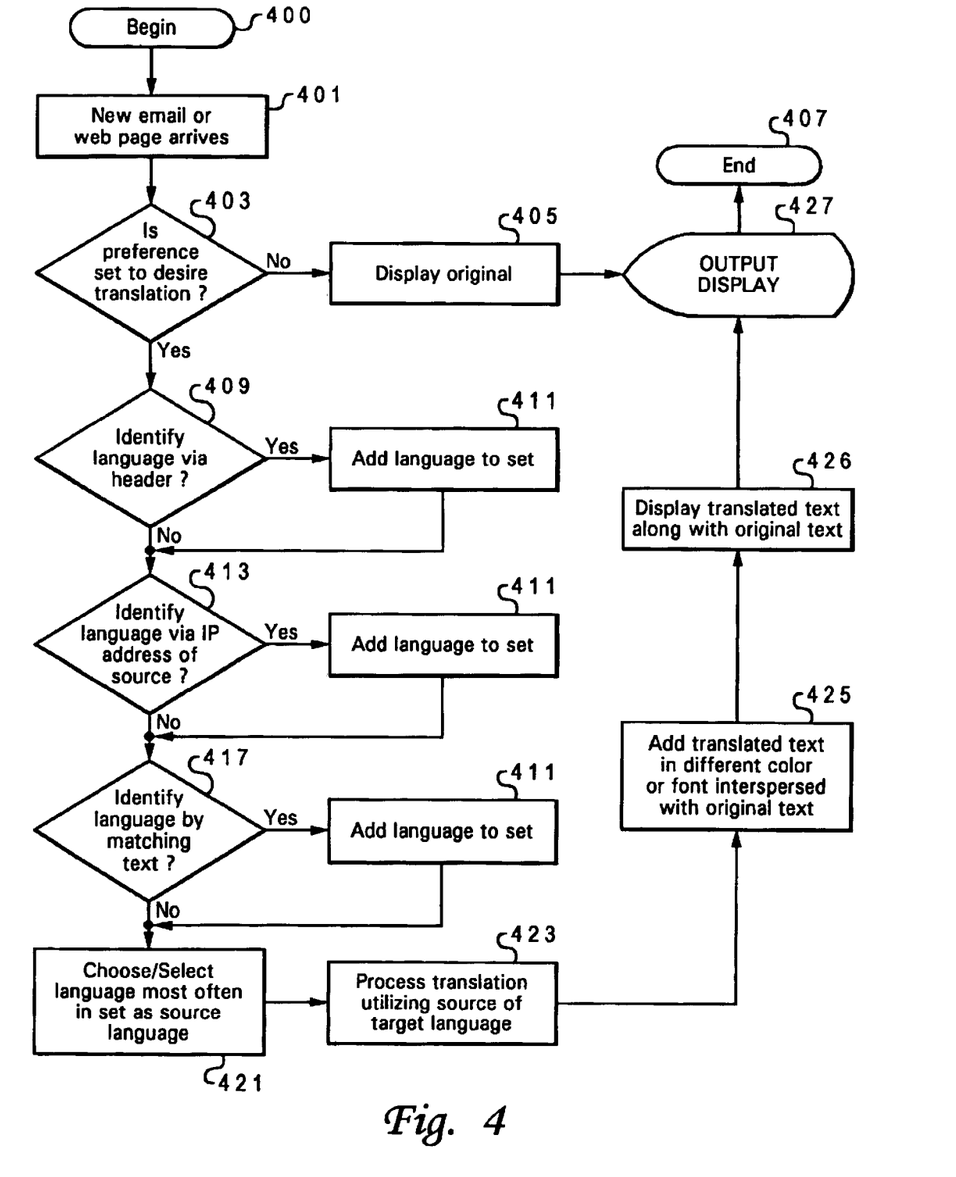
FIG. 4 is a logic flow chart of an implementation of the present invention in an email environment in accordance with the preferred embodiment of the present invention.

FIG. 4 depicts a more specific implementation of the invention, namely the implementation of the invention in an email environment whereby email messages are received and sent over the Internet. The process begins (step 400) when new email arrives on the web page inbox of the user (step 401). The data processing system then checks to see if the automatic translation desired functioned has been selected by the user (step 403). If the function is not selected, then no automatic translation is desired and the original text of the e-mail is retained in the inbox until selected for display (step 405). This completes the process (step 407). If however, the function has been set for automatic translation, then the language identification process begins. The process first determines if the language may be identified by header information (step 409). If this identification is successful, then the language is added to the set (step 411). The "set" refers to a list of possible languages which the message may be composed in. Next, the process tries to identify the language identified by an IP address or by the IP address of the source (step 413). If this determination results in the language being identified, then the language is added to the language set (step 411). Following, the process determines-if the language may be identified by matching the text of the communication to a list of language clues (step 417) based on the character set utilized. If the text of the communication is successfully matched and the language identified, then it is added to the language set (step 411). Once these identification processes are completed, the language most often in the set of the source language is chosen (step 421). Following, the translation proceeds utilizing the source and target language (step 423). The translated text is then added in a different color interspersed with or below the original text (step 425) and displayed (step 426). When the user checks the inbox messages, the translated text is sent to output (step 426) and displayed (step 427). The process then ends (step 407). If no language match is found then the output of the original message is given along with a message to the user informing him that the language of the incoming message could not be located on the system.

The process above describes a series of determination steps to identify the language. In this illustrative embodiment, this series of steps help to provide a more accurate determination of the language of the incoming communication. In the preferred embodiment, the results of the analysis gives a best match of the originating language. In another embodiment of the present invention, once a language is identified, then the process jumps to the translation steps.

One method of identifying the language is by analyzing character sets. In the preferred embodiment, character sets, as utilized in the present example, are not limited to Roman character sets. It is understood that alternative character sets, for example Japanese, exist and are incorporated in the analysis process. In the preferred embodiment of the present invention, all language sets are contemplated and may be translated.

While the invention has been particularly shown and described with reference to a preferred embodiment, it will be understood by those skilled in the art that various changes in form and detail may be made therein without departing from the spirit and scope of the invention. For example, it is understood that any number of determining steps may be implemented to determine the language of the incoming message and that all such methods fall within the scope of the invention.

What is claimed is:

1. A method of providing received electronic communications at a data processing system in a human language desired by a recipient of said electronic communication, said method comprising:

intercepting an incoming communication at said data processing system, when said incoming communication is provided in a first human language, which is different from the desired human language; and responsive to said intercepting step, dynamically translating said incoming communication into said desired human language.

2. The method of claim 1, wherein said dynamically translating includes forwarding said incoming communication to a language translation environment selected from among a local application on said data processing system and a networked application located externally to said data processing system.

3. The method of claim 1, further comprising identifying the language of the incoming communication by conducting at least one of a plurality of language identifying steps from among:

scanning the communication for predefined language clues;

analyzing tags which accompany the textual data of said communication to create code pages;

deciphering the origination address of said communication; and checking the headers of document files for clues.

4. The method of claim 1, further comprising providing the incoming communication in the first human language with a translated communication in said desired human language.

5. The method of claim 1, instantiated within a voice communication environment, wherein said translating step further includes the steps of:

first converting voice communication data into textual form utilizing a voice-to-text software application; and responsive to a completion of said translating step, converting said translated text into voice data for output as audio signal utilizing a text-to-voice software application.

6. The method of claim 1, wherein said data processing system hosts an email environment, said incoming communication is an email routed to an inbox associated with an email address, said method further comprising mirroring a translated copy of said incoming communication in addition to an original copy in said first language within said inbox.

7. The method of claim 1, wherein said intercepting step includes analyzing said incoming communication to determine if said first human language is not said desired human language.

8. The method of claim 1, further including the step of selecting a desired human language for user interface with resident software applications on said data processing system.

9. The method of claim 1, further comprising notifying a recipient that said incoming communication has been translated.

10. A data processing system-based electronic communication system comprising:

logic for intercepting an incoming communication to said data processing system, when said incoming communication is provided in a first human language, which is different from a desired human language; and means, responsive to said intercepting, for dynamically translating said human language of said incoming communication into said desired human language.

11. The system of claim 10, wherein said dynamically translating means includes forwarding said incoming communication to a language translation environment selected from among a local application on said data processing system and a networked application located externally to said data processing system.

12. The system of claim 10, further comprising a graphical user interface with a language selection feature that permits a user to select said desired human language utilized by said translation means from among a plurality of language choices.

13. The system of claim 12, wherein said graphical user interface includes means for user-selection of a toggling-on and off of said intercepting and subsequent translating features.

14. The system of claim 10, further comprising means for identifying the first human language by conducting at least one of a series of language identifying steps from among scanning the communication for predefined language clues;

analyzing tars which accompany the textual data of said communication to create code pages;

deciphering the origination address of said communication; and checking the headers of document files for clues.

15. The system of claim 10, further comprising means for providing the incoming communication in the first human language with a translated communication in said desired human language.

16. The system of claim 10, instantiated within a voice communication environment, further comprising:

means for first converting voice communication data into textual form utilizing a voice-to-text software application; and means for converting translated text into voice data for output as audio signal utilizing a text-to-voice software application.

17. The system of claim 10, wherein said data processing system hosts an email environment, said incoming communication is an email routed to an inbox associated with an email address, said system further comprising means for mirroring a translated copy of said incoming communication in addition to an original copy in said first language within said inbox.

18. The system of claim 10, wherein said intercepting logic includes means for analyzing said incoming communication to determine if the first human language is not said desired human language.

19. The system of claim 10, further comprising means for notifying a recipient that said incoming communication has been translated.

20. A computer program product for recipient-side translation of communication received by a data processing system, said program product comprising:

a computer readable medium; and program instructions on said computer readable medium for:

intercepting an incoming communication at said data processing system, when said incoming communication is provided in a first human language, which is different from the desired human language; and responsive to an interception, dynamically translating said first human language of said incoming communication into said desired human language.

21. The program product of claim 20, wherein said program instructions for said dynamically translating includes forwarding said incoming communication to a language translation environment selected from among a local application on said data processing system and a networked application located externally to said data processing system.

22. The program product of claim 20, further comprising program instructions for providing a graphical user interface with a language selection feature that permits a user to select said desired human language utilized by said translation means from among a plurality of language choices.

23. The program product of claim 22, wherein said program instructions for providing said graphical user interface includes program instructions for user-selection of a toggling-on and off of said intercepting and subsequent translating features.

24. The program product of claim 20, wherein said program instructions for said translating step further includes program instructions for identifying the first human language by executing at least one of a series of language identifying program instructions from among:

scanning the communication for predefined language clues;

analyzing tags which accompany the textual data of said communication to create code pages;

deciphering the origination address of said communication; and checking the headers of document files for clues.

25. The program product of claim 19, further comprising instructions for providing the incoming communication in the first human language with a translated communication in said desired human language.

26. The program product of claim 19, instantiated within a voice communication environment wherein said program instructions for said translating step further includes program instructions for:

first converting voice communication data into textual form utilizing a voice-to-text software application; and converting translated text into voice data for output as audio signal utilizing a text-to-voice software application.

27. The program product of claim 19, wherein said data processing system hosts an email environment, said incoming communication is an email routed to an inbox associated with an email address, said program instructions further comprising instructions for mirroring a translated copy of said incoming communication in addition to an original copy in said first language within said inbox.

28. The program product of claim 20, wherein said program instructions further includes program instructions for analyzing said incoming communication to determine if said first human language is not said desired human language.

* * * * *

UNITED STATES PATENT AND TRADEMARK OFFICE
CERTIFICATE OF CORRECTION

PATENT NO. : 6,901,367 B1
DATED : May 31, 2005
INVENTOR(S) : Victors Berstis et al.

It is certified that error appears in the above-identified patent and that said Letters Patent is hereby corrected as shown below:

Title page,
Item [57], ABSTRACT,
Line 9, after "language-based" and before "information" delete "ad".

Signed and Sealed this

Sixth Day of June, 2006

JON W. DUDAS
*Director of the United States Patent and Trademark Office*